United States Patent [19]
Sobottka et al.

[11] 3,978,441
[45] Aug. 31, 1976

[54] PERMANENT MAGNET HOLDING SYSTEM

[75] Inventors: Gert Sobottka, Cappenberg; Peter Pagenkemper, Dortmund-Schuren; Heinrich Eisenburger, Bochum-Langendreer; Werner Schoof, Dortmund-Aplerbeck, all of Germany

[73] Assignee: Deutsche Edelstahlwerke Aktiengesellschaft, Krefeld, Germany

[22] Filed: Sept. 5, 1974

[21] Appl. No.: 503,508

[30] Foreign Application Priority Data
Sept. 13, 1973 Germany............................ 2346042

[52] U.S. Cl................................ 335/284; 335/289
[51] Int. Cl.²...................... H01H 7/04; H01H 7/06
[58] Field of Search ........... 335/284, 285, 289, 290, 335/295; 340/174 ZB

[56] References Cited
UNITED STATES PATENTS

| | | | |
|---|---|---|---|
| 3,089,064 | 5/1963 | Bennetot............................ | 335/289 |
| 3,428,867 | 2/1969 | Becker............................... | 335/284 |
| 3,732,550 | 5/1973 | Haupt............................. | 340/174 ZB |
| 3,740,683 | 6/1973 | Benson.............................. | 335/284 |
| 3,824,516 | 7/1974 | Benowitz........................... | 335/284 |

*Primary Examiner*—Harold Broome
*Attorney, Agent, or Firm*—Cushman, Darby & Cushman

[57] ABSTRACT

A permanent magnet holding system, e.g. adapted to handle ferromagnetic material, of which the cancellation of the magnetic holding force is effected with a minimum expenditure of energy, and wherein the external magnetism may reliably be cancelled out, comprises two or more permanent magnets fitted with polepieces so disposed that the external holding force can be controllably varied to total disappearance by a polarity reversal of permanent magnets by means of an electromagnetic coil; wherein the permanent magnet or magnets which the coil is intended to repolarize is/are made of a low coercivity permanent magnet material, and the other permanent magnet(s) is/are made of a relatively high coercivity material.

5 Claims, 12 Drawing Figures

(A-B)

PERMANENT MAGNET HOLDING SYSTEM

This invention relates to a permanent magnet holding system of the type comprising two or more permanent magnets fitted with pole-pieces of ferromagnetic material, particularly soft iron, so disposed that the external holding force can be controllably varied and made completely to disappear by a polarity reversal of at least one of the permanent magnets induced by an electromagnetic coil.

Several forms of holding magnet systems providing a holding force that can be controllably varied to vanishing point are already known, for instance as published in "TZ fur praktische Metallbearbeitung", 55th year, 1964, No. 9, pp 498 to 504. In principle a distinction must be made between electromagnetic and permanent magnet systems. The variability of the holding force of a permanent magnet is brought about by changing the position of the permanent magnets in relation to their polepieces, thereby causing the flux path to close within the system and the externally effective holding force to be partly or wholly nullified. Such permanent magnet systems which can be mechanically "switched" are expensive to produce and are bulky because of the space required for the shift mechanism.

A change in the holding power of electromagnetic systems can be achieved by varying the number of effective turns of the coil or by varying the current supplied to the coil. The holding power of the electromagnet can thus be weakened or made to disappear entirely by switching off the current.

Magnet systems have also been proposed, for instance in Gorman Patent Specification No. 1,014,674, which are fitted with both permanent magnets and electromagnets and in which the holding power of the permanent magnet is variable to vanishing point by the countervailing power of the electromagnets. This change in the holding power of such systems is effected by sending a current through an electrical coil located in the neighbourhood of a permanent magnet, so that the field of the coil and that of the permanent magnet are contradirectional. Consequently the flux of the permanent magnet may be either displaced into a flux path shunt (displacement system) or the permanent magnet may be demagnetised (demagnetisation system). The displacement system has the drawback that the magnetic force of the permanent magnet is nullified only for as long as current flows through the coil. This means that a current must be maintained through the coil for the entire period the system is not required to provide an external holding force. The same disadvantage is shared by a purely electromagnetic system which is effective only for as long as it is supplied with current. If the current is cut off or if it fails both these known types of magnet systems become ineffective.

The demagnetisation system has the drawback that the magnetic field strength of the electromagnetic coil must be precisely matched to the permanent magnet to bring about its total demagnetisation, i.e. to reduce to zero also the remanence. This is difficult to accomplish and special means are required.

For instance French Patent Specification No. 1,215,224 describes a combination permanent magnet and electromagnetic system comprising at least two permanent magnets, the polarity of one of them being completely reversed when the external holding power of the system is to be rendered ineffective and the system is to be "switched off" (polarity reversal principle). In the magnetically effective state the polarities of both permanent magnets are codirectional. When the polarity of one magnet has been reversed the magnetisations of the two permanent magnets are contradirectional and mutually cancel each other out, so that no external holding force is produced and a part that has been held by the system will drop off. In order to reactivate the magnet system the polarity of the one permanent magnet must again be reversed. As in the above mentioned displacement system polarity reversal also causes internal short circuiting of the magnetic lines of force inside the system. If either system is to work it is a necessary condition that the magnetic field strength of the electromagnet in a displacement system and that of the repolarised permanent magnet in a polarity reversal system is the same as that of the other permanent magnet.

Compared with the displacement system the polarity reversal principle has the advantage that the magnet system can be switched off by passing a short d.c. pulse through the electromagnetic coil for reversing the polarity of one of the permanent magnets, whereas in the displacement system, as already mentioned, the electromagnetic coil must continue to carry current for as long as the system is to remain magnetically active. On the other hand, the polarity reversal system is also open to a decisive objection. This is that when reversing the polarity of one of the permanent magnets by the electromagnetic coil the other magnet is unintentionally partly demagnetised. This means on the one hand that the flux of the repolarised permanent magnet will exceed the flux of the partly demagnetised other permanent magnet. On the other hand, for a renewed polarity reversal of the one permanent magnet it is then necessary to remagnetise the previously partly demagnetised permanent magnet. This is possible only if a special coil is associated with each permanent magnet as already proposed for the magnet system described in the above mentioned French Patent Specification No. 1,215,225. Naturally this involves additional means and expense.

Another objection which applies to polarity reversal systems arises more particularly in the case of large and powerful magnet systems. The greater the holding power of the system the more energy must be expended for repolarising some of the permanent magnets. This is undesirable from the point of view of economy and, besides, when reversing the polarity of some of the permanent magnets the remanent holding force due to the partial demagnetisation of the other permanent magnets is the higher the greater the holding power of the system. In powerful magnet systems the parts held by the system may thus refuse to drop off when repolarisation of some of the permanent magnets takes place.

It is therefore an object of the present invention to avoid such disadvantages of known combination permanent magnet electromagnetic systems, wherein the arrangement requires a minimum expenditure in energy, and permits the external magnetism to be reliably cancelled out without a remanent holding force.

The invention provides a permanent magnet holding system of the type set forth wherein the permanent magnet or magnets which the coil is intended to repolarise is/are made of a low coercivity permanent magnet material, and the other permanent magnet(s) is/are made of a relatively high coercivity material.

The permanent magnet or magnets of which the polarity is to be reversed should provide the same magnetic flux as the other permanent magnet or magnets. This is necessary to ensure that the magnetic flux of the repolarised permanent magnet or magnets will in fact fully compensate the magnetic flux of the other permanent magnet or magnets that are not repolarised so that no remanent holding force will remain.

By virtue of the fact that the permanent magnet or magnets which are to be repolarised by the electromagnetic coil are made of a low coercivity material for instance of a metallic magnet material e.g., AlNiCo, the magnetic field strength the coil must provide to bring about the desired polarity reversal need not be very high. Besides economising in power this has the particular advantage that the permanent magnet or magnets which are not intended to be repolarised, and which according to the invention also consist of a relatively high coercivity permanent material e.g., barium, strontium or lead ferriate, are not affected by the repolarisation of the low coercivity permanent magnets, e.g., that they are not partly demagnetised as occurs in prior systems of a similar kind.

In the simplest possible arrangement according to the invention the permanent magnet system may comprise two permanent magnets and one electromagnet in suitable combination. The permanent magnet which is intended to be repolarisable must be located in the magnet field of the electromagnetic coil. For this purpose the coil may be arranged to embrace this permanent magnet. Alternatively a system might comprise more than two permanent magnets, and the number of permanent magnets need not be even. It may also be odd. The only essential point is that the entire magnetic flux of the permanent magnet or magnets that are to be repolarised must equal the total magnetic flux of the other high coercivity permanent magnets which are not intended to be repolarised, to ensure that the two fluxes after repolarisation of the magnet or magnets of low coercivity material will just cancel each other out. This naturally requires the permanent magnets to be positioned so that their directions of magnetisation are parallel and the electromagnetic coil must be located and designed to change the polarity of the low coercivity permanent magnets in either direction. For this purpose one or several electromagnetic coils may be included in the system.

The proposed permanent magnet system is particularly suitable for solving problems connected with handling ferromagnetic materials and may be geometrically designed in suitable modifications as a holding unit, a handling roll or a belt conveyor.

For embodying permanent magnet systems according to the invention many possibilities are available. Number, shape, disposition, material and magnetisation of the permanent magnets as well as the polepieces, housings, fastening means etc. of the system can be suitably varied. The embodiments illustratively shown in the drawing are therefore merely examples of permanent magnet systems designed according to the invention.

Figure 1:
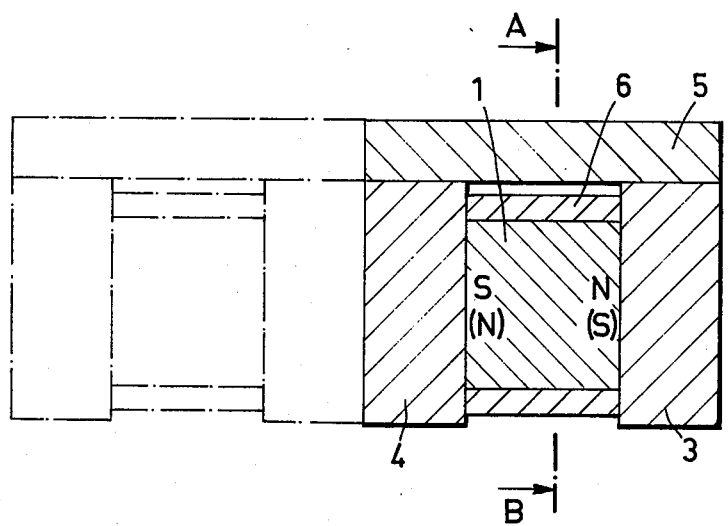
FIG. 1 is a sectional view of a first embodiment of a magnet holding system embodying the principles of the present invention.
Figure 2:
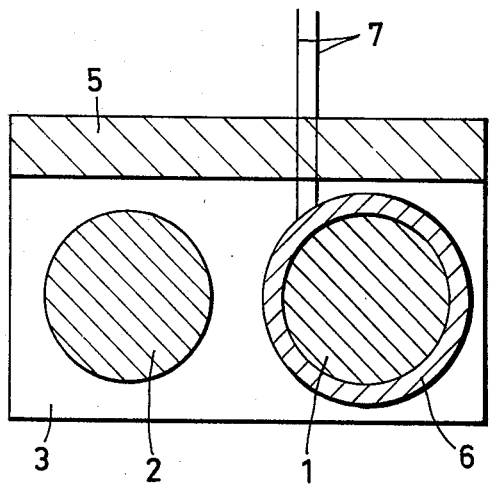
FIG. 2 is a sectional view taken on the line A-B of FIG. 1.

In the permanent magnet holding system according to the invention schematically shown in FIGS. 1 and 2 two permanent bar magnets 1 and 2 having ferromagnetic e.g. soft iron polepieces 3 and 4 are connected by a plate 5 which cannot be magnetised.

The permanent magnet 1 consists of a low coercivity permanent magnet material and is embraced by an electromagnetic coil 6 which can be supplied with current by supply leads 7. The other permanent magnet 2 consists of a high coercivity permanent magnet material, but it generates the same magnetic flux as the permanent magnet 1.

In their magnetically effective state the permanent magnets 1 and 2 are codirectionally magnetised, as indicated by letters N, S in FIG. 1, so that like poles of both permanent magnets 1 and 2, say south poles, abut the polepieces 4 and induce the polarity of a south pole in this polepiece, whereas the polarity of a north pole is induced in the other polepiece 3.

If it is now desired to cancel the externally effective holding force of the system, a short current pulse is sent through the leads 7 and the coil 6. The coil 6 must be so calculated that the magnetic field strength generated thereby is sufficient to change the polarity of the permanent magnet 1. When this permanent magnet 1 has been repolarised by the coil 6 this permanent magnet 1 will induce a polarity in the polepieces 3 and 4, which is the reverse of that induced by the other permanent magnet 2, so that the magnetic forces compensate, the system being internally magnetically short-circuited and generating no external holding force. The state of polarisation after the polarity reversal of the permanent magnet 1 is indicated by letters N, S placed in brackets. If now the polarity of the permanent magnet 1 is again reversed by coil 6 its original state of polarisation can be re-established, and the system will again produce an externally effective holding force.

The arrangement illustrated in FIGS. 1 and 2 could be readily modified by designing the poleshoe 3 as a ring, poleshoe 4 as a bar and the two permanent magnets 1 and 2 each as a half ring or a ring segment of which one were provided with a repolarising coil 6. Moreover, as indicated in dot-dash lines in FIG. 1, the system can also be extended by multiplication.

Figure 3:
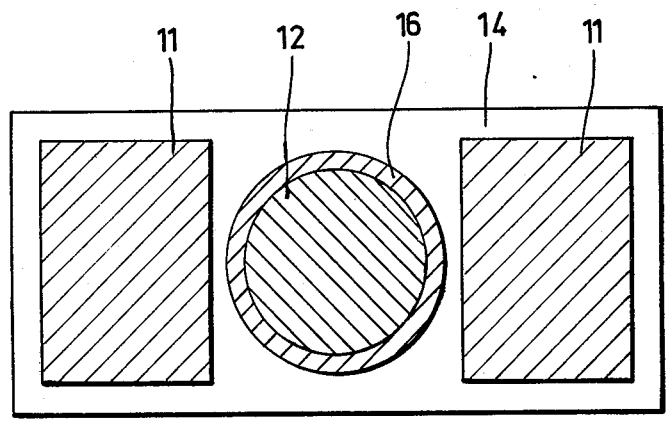
FIGS. 3 and 4 are sectional views of a second embodiment of a magnet holding system.
Figure 4:
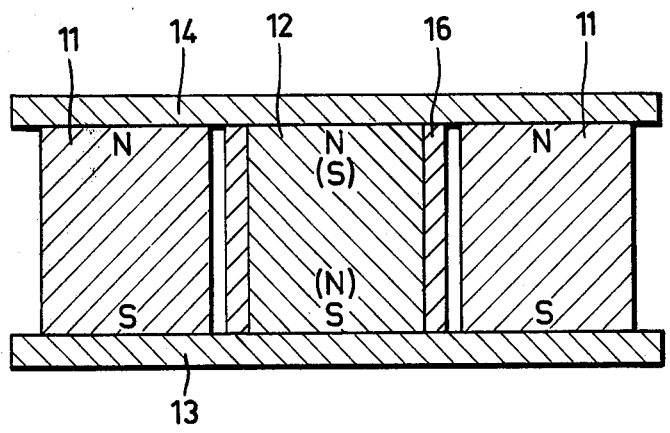

A different form of construction of a permanent magnet system according to the invention is illustratively shown in FIGS. 3 and 4. In this magnetic holding system there are three permanent magnets 11 and 12 of which the permanent magnet 12 consisting of a low coercivity magnet material is embraced by an electrical coil 16 by means of which its polarity can be reversed. However, the permanent magnets 11 consist of a high coercivity permanent magnet material and the sum of their magnetic fluxes is equal to the flux of the single permanent magnet in the middle. In the magnetically effective state like poles of the permanent magnets 11 and 12 abut pole plates 13 and 14 in which the polarities of a north and a south pole respectively are induced.

After a polarity reversal of the permanent magnet 12 by means of the coil 16, polarities are induced in the pole plates 13 and 14 which are contrary to those induced by the permanent magnets 11. Consequently the lines of force close inside the pole plates and do not create an external magnetic field.

In the embodiment according to FIGS. 3 and 4 the permanent magnets 11 are oblong blocks although they could have some other desired shape. Moreover, in FIG. 3 the oblong cross section might be replaced by a circular section imparting a wheel or ring shape to the system.

Figure 5:
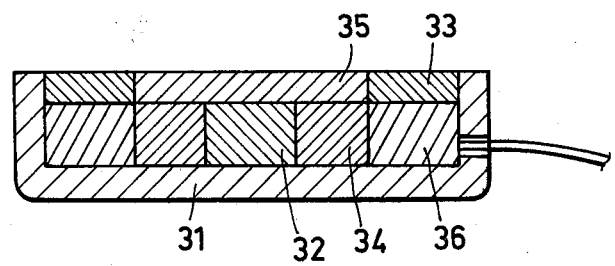
FIG. 5 is a sectional view of a third embodiment of a magnet holding system and FIG. 6 is a schematic plan view thereof.
Figure 6:
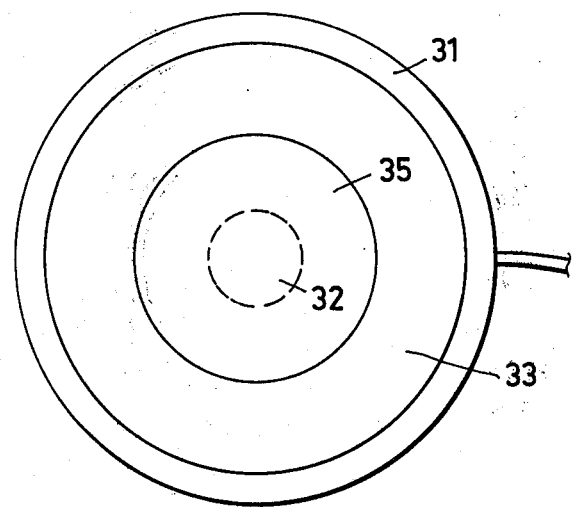

The electrically switchable permanent magnet holding system illustrated in FIGS. 5 and 6 is cup-shaped with a view to achieving optimal production conditions. A cup 31 contains a round section rod 32 consisting of a relatively low coercivity permanent magnet material surrounded concentrically by a permanent magnet ring 34 made of a high coercivity permanent magnet material. Both these magnets are covered by a pole plate 35. Both permanent magnets 32 and 34 are surrounded by a coil 36 which enables the polarity of the permanent magnet 32 to be reversed. The entire system is embedded in a casting compound 33.

Figure 7:
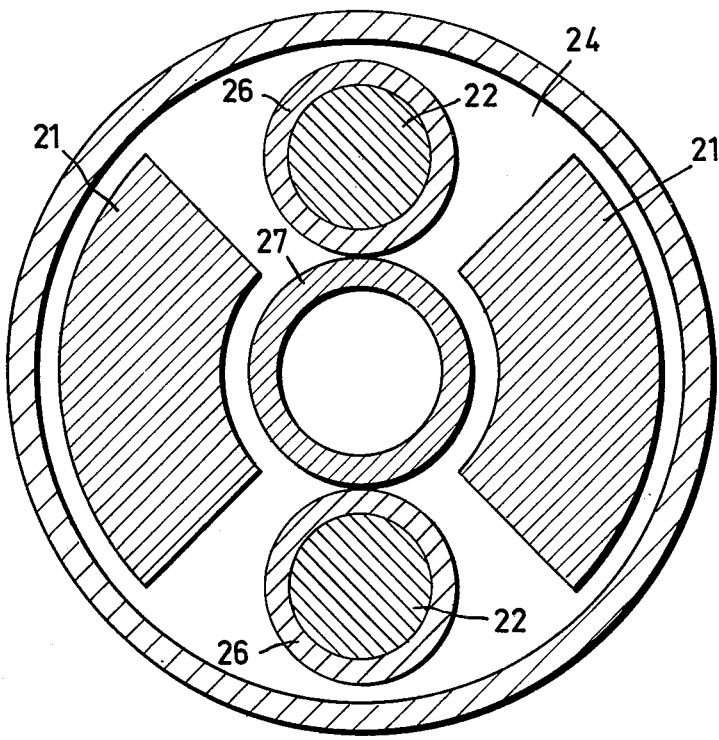
FIG. 7 is a sectional view of a fourth embodiment of a magnet holding system and FIG. 8 is a schematic plan view thereof.
Figure 8:
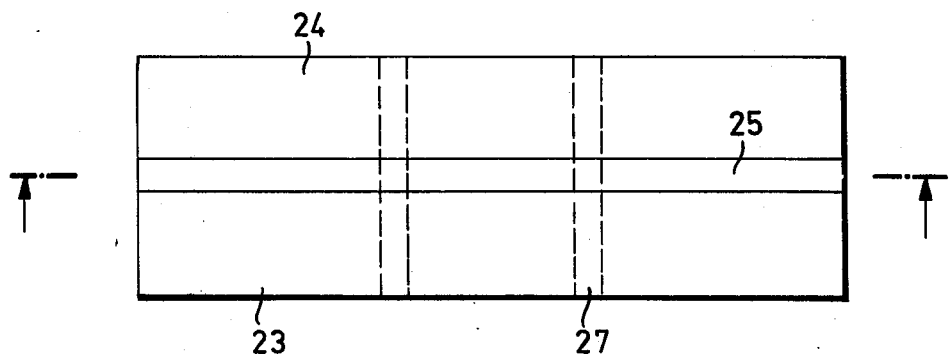

An example of such a permanent magnet system in an application as a handling roll is illustrated in FIGS. 7 and 8. The system contains two permanent magnets 21 each in the form of an annular segment and two rod-shaped permanent magnets 22, each of the latter being embraced by an electrical coil 26. The permanent magnets 21, 22 are contained inside rings 23 and 24 which are magnetically separated by an interposed ring 25 (FIG. 8) made of a non-ferromagnetic material. An axle or shaft can be passed through a bush 27 in the centre.

The handling roll illustrated in FIGS. 7 and 8 is externally magnetically effective when all the permanent magnets 21 and 22 induce the same polarity in the ferromagnetic rings 23 respectively 24. If the polarities of the permanent magnets 22 are reversed by their coils 26 the magnetic lines of force will close within the rings 23 and 24 and externally the system will lose its magnetism. However, as soon as the magnets 22 are repolarised to reassume their former polarity the external magnetic force will again become fully effective.

FIGS. 9 to 12 show an enbodiment of the invention in its application to a belt conveyor. Belt conveyors which can be activated by permanent magnets are already known for conveying magnetic parts on top of such a belt, or hanging from the belt or adhering to the belt travelling vertically. The magnets in such conveyors are installed in a frame structure in rows sometimes with the employment of auxiliary poles, and covered with a non-magnetic material above which the endless conveyor belt runs on rollers. The conveyed parts drop off at the end of the conveyor belt after having been carried out of effective range of the magnetic field.

If in such a conveyor system the conveyed part is to be deposited in a precisely prescribed position, then the conveyors must be controllably switchable.

Belt conveyors which are activated by permanent magnets have already been described, in which the effect of the permanent magnets is nullified by tilting or swivelling the magnets inside the conveyor. These tilting or swivel motions are pneumatically or hydraulically controlled by appropriate operating lever arms and rods. This means that moving parts are necessary which represent an expenditure in technical means and require regular servicing. Another drawback is that the switching ranges provided by several systems associated by common operating linkages can be changed only by reconstruction of the installation.

Similarly, known electromagnetically operating belt conveyors used for stacking, in which current carrying coils produce electromagnetic fields in the conveying zone, have the drawback that a sudden power failure results in the conveyed articles dropping off out of control, with the possible result of major damage to other machinery or injury to personnel. Since the magnetic field is electrically produced the installed coils must be permanently under load. In order to achieve short switching times considerable power must be nullified by counter excitation and this involves the generation of considerable heat.

The drawbacks of mechanically controllable belt conveyors and of electrically activated belt conveyors can be avoided by using permanent magnet holding systems according to the invention, which provide a holding force that can be nullified by electrical fields.

Figure 9:
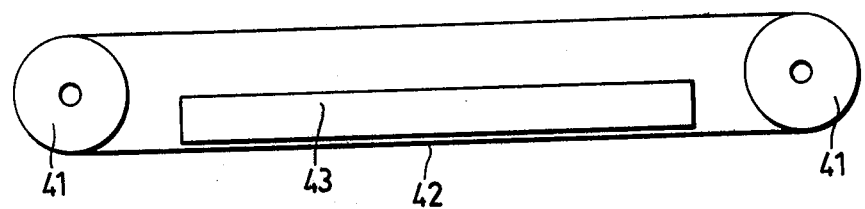
FIGS. 9 and 10 are schematic elevational and plan views of an endless conveyor system employing magnetic holding systems.
Figure 10:
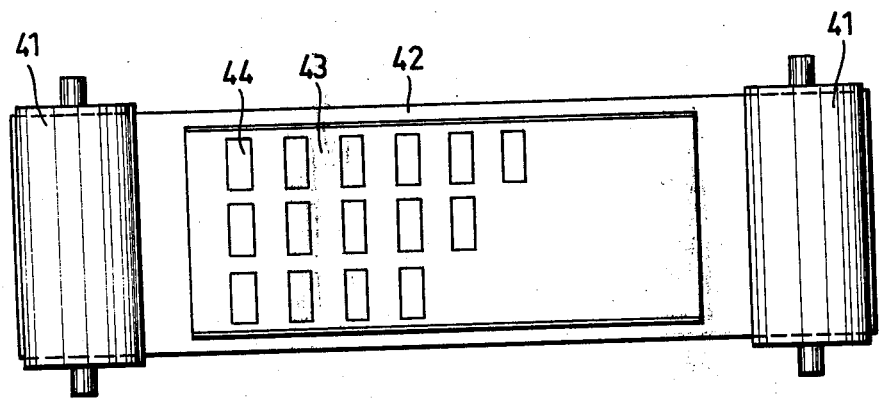
Figure 11:
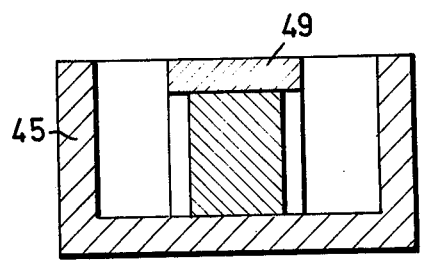
FIG. 11 is a sectional view of a fifth embodiment of a magnet holding system and FIG. 12 is a schematic plan view thereof.
Figure 12:
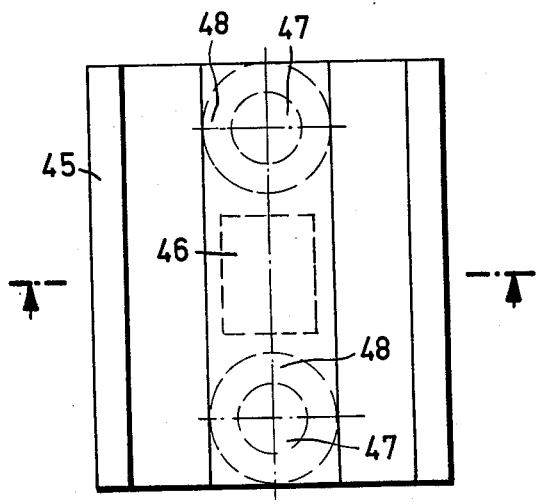

FIG. 9 is a side elevational view of an endless belt conveyor 42 running over return rollers 41, ferromagnetic objects being transported resting on the belt or hanging from its underside. In order to make the material adhere to the conveyor belt 42 during transportation a frame or box 43 is provided between the upper and bottom runs of the belt 42. This contains magnet systems 44 according to the invention disposed in one or several rows (FIG. 10). The magnet systems 44 may be of any desired shape, for instance as illustrated in FIGS. 3 and 4, or as shown in FIGS. 11 and 12. The magnet system according to FIGS. 11 and 12 consists of a U-section member 45 of ferromagnetic material which in the middle contains a permanent magnet 46 of high coercivity material and on each side a permanent magnet 47 of low coercivity material, the latter being each surrounded by an electromagnetic coil 48 and all three magnets being covered by a common pole plate 49. In the magnetically activated state the magnets 46, 47 induce one polarity in the pole plate 49 and the other polarity in the flanges 45 of the U-section. Assuming that it is desired to deposit the ferromagnetic material conveyed by the belt 42 at a specific location then the permanent magnet or magnets of a low coercivity material in the magnet system 44, or if there are several magnet systems 44 combined in a commonly controlled group, the low coercivity magnets in this group, have their polarities reversed by the energisation of the associated coils 48. This causes the magnetic lines of force to close internally within the magnet system and the external magnetic field to collapse so that material adhering to the conveyor belt 42 at this point will cease to be held and drop off.

Since very structural modifications and amplifications of such a magnet system can be devised it will be readily understood that the embodiments shown in the drawing are not intended in any way to limit the scope of the present invention.

What is claimed is:

1. A permanent magnet holding system comprising a plurality of permanent magnets disposed so that their directions of magnetization are parallel and offset from each other, an electromagnetic coil associated with at least one of said permanent magnets for reversing the polarity thereof, said permanent magnets being fitted with two polepieces so disposed that the external magnetic holding force can be controllably varied to total disappearance by a polarity reversal of said at least one permanent magnet, said at least one permanent magnet being made of a low coercivity material, and the other permanent magnets being made of a relatively high coercivity material one of said polepieces being U-shaped, said permanent magnets and said coil being disposed within said U-shaped polepiece, and the other polepiece being a generally flat plate overlying said magnets and said coil and disposed between the legs of said U-shaped polepiece.

2. A permanent magnet holding system as in claim 1 wherein said at least one permanent magnet is surrounded by said coil.

3. A permanent magnet system as in claim 1 wherein said polepieces are ferromagnetic.

4. A permanent magnet holding system comprising a plurality of permanent magnets disposed so that their directions of magnetization are parallel and offset from each other, an electromagnetic coil associated with at least one of said permanent magnets for reversing the polarity thereof, said permanent magnets being fitted with polepieces so disposed that the external magnetic holding force can be controllably varied to total disappearance by a polarity reversal of said at least one permanent magnet, said polepieces including at least two axially spaced apart coaxial ferromagnetic rings surrounding said magnets so as to form a magnetic handling roll, said at least one permanent magnet being made of a low coercivity material, and the other permanent magnets being made of a relatively high coercivity material.

5. A permanent magnet holding system comprising: a plurality of holding devices each of which includes a plurality of permanent magnets disposed so that their directions of magnetization are parallel and offset from each other, an electromagnetic coil associated with at least one of said permanent magnets for reversing the polarity thereof, said permanent magnets being fitted with ferromagnetic polepieces so disposed that the external magnetic holding force can be controllably varied to total disappearance by a polarity reversal of said at least one permanent magnet, said at least one permanent magnet being made of a low coercivity material, and the other permanent magnets being made of a relatively high coercivity material; an endless conveyor belt having a conveying surface and an opposite surface which faces upwardly, a plurality of said holding devices being arranged side-by-side in the direction of travel of said belt and adjacent said opposite surface of said belt, each of said holding devices including a U-shaped first polepiece facing said opposite surface of said belt, said permanent magnets and coil being disposed within said U-shaped polepiece.

* * * * *